(12) United States Patent
Potlabathini et al.

(10) Patent No.: US 9,903,492 B2
(45) Date of Patent: Feb. 27, 2018

(54) ROLL OVER VALVE FOR FUEL TANK

(71) Applicants: Hyundai Motor Company, Seoul (KR); Kia Motors Corporation, Seoul (KR); Hyundai Motor India Engineering PVT, LTD., Hyderabad (IN)

(72) Inventors: Sreekanth Potlabathini, Hyderabad (IN); Chun Kyu Park, Whasung-Si (KR)

(73) Assignees: Hyundai Motor Company, Seoul (KR); Kia Motors Corporation, Seoul (KR); Hyundai Motor India Engineering PVT, LTD., Hyderabad (IN)

( * ) Notice: Subject to any disclaimer, the term of this patent is extended or adjusted under 35 U.S.C. 154(b) by 0 days.

(21) Appl. No.: 15/096,436

(22) Filed: Apr. 12, 2016

(65) Prior Publication Data

US 2017/0175911 A1 Jun. 22, 2017

(30) Foreign Application Priority Data

Dec. 16, 2015 (IN) .......................... 4136/DEL/2015

(51) Int. Cl.
*F16K 17/36* (2006.01)
*B60K 15/035* (2006.01)
*F16K 24/04* (2006.01)

(52) U.S. Cl.
CPC ........ *F16K 17/36* (2013.01); *B60K 15/03519* (2013.01); *F16K 24/044* (2013.01); *Y10T 137/0826* (2015.04); *Y10T 137/0874* (2015.04)

(58) Field of Classification Search
CPC ........ F16K 17/36; F16K 24/04; F16K 24/042; F16K 24/044; B60K 15/03519; Y10T 137/0826; Y10T 137/0874
USPC .......................................................... 137/43
See application file for complete search history.

(56) References Cited

U.S. PATENT DOCUMENTS 8,424,819 B2 * 4/2013 Tsuzuki et al. .. B60K 15/03519
137/202
8,910,675 B2 12/2014 Coulon et al.

FOREIGN PATENT DOCUMENTS

| EP | 0 674 129 B1 | 9/1995 |
|----|----|----|
| JP | 1997-004526 A | 1/1997 |
| JP | H094526 A | 1/1997 |
| JP | 2006-118412 A | 5/2006 |
| JP | 2009-227032 A | 10/2009 |
| JP | 2011-201490 A | 10/2011 |
| KR | 20-1999-0026417 A | 7/1999 |
| KR | 10-2007-0059551 | 6/2007 |

* cited by examiner

*Primary Examiner* — Kevin Lee
(74) *Attorney, Agent, or Firm* — Morgan, Lewis & Bockius LLP

(57) ABSTRACT

A roll over valve for a fuel tank of a vehicle may include a plurality of oil surface variable fuel inflow tubes mounted on an inlet through which fuel is introduced into a float of a single type roll over valve mounted on the fuel tank.

8 Claims, 7 Drawing Sheets ically inclined at a predetermined angle or more or turns over, a roll over valve is mounted inside the fuel tank, which prevents fuel from being leaked to a canister and evaporation gas in the fuel tank is collected in the canister through the roll over valve at ordinary time.

ROLL OVER VALVE FOR FUEL TANK

CROSS-REFERENCE TO RELATED APPLICATION

The present application claims priority to Indian Patent Application No. 4136/DEL/2015, filed Dec. 16, 2015, the entire contents of which is incorporated herein for all purposes by this reference.

BACKGROUND OF THE INVENTION

Field of the Invention

The present invention relates to a roll over valve for a fuel tank of a vehicle, and more particularly, to a roll over valve for a fuel tank of a vehicle which can increase a fuel filling capacity of the fuel tank and improve venting performance by dividing a fuel inlet of the roll over valve for the fuel tank into two or more.

Description of Related Art

In general, under a situation in which a vehicle is inclined at a predetermined angle or more or turns over, a roll over valve is mounted inside the fuel tank, which prevents fuel from being leaked to a canister and evaporation gas in the fuel tank is collected in the canister through the roll over valve at ordinary time.

Herein, a single type roll over valve for the fuel tank in the related art will be described below.

FIGS. 1 and 2 are a perspective view and a schematic cross-sectional view illustrating a roll over valve for a fuel tank in the related art and FIG. 3 is a cross-sectional view illustrating a roll over valve operating state in the related art.

In FIGS. 1 and 2, reference numeral 10 represents a housing of the roll over valve.

A nipple 12 for connection with the canister is provided to discharge the evaporated gas is formed on the top of the housing 10, an inlet 14 into which the evaporated gas or the fuel is introduced is formed on the bottom of the housing 10, and a float 20 which is elevatable by buoyancy is embedded in the housing 10.

Further, an orifice 16 through which the evaporation gas is discharged is formed on the top of the housing 10, that is, just at an upper side corresponding to the top of the float 20 and a cut-off protrusion 22 that plugs up the orifice 16 integrally protrudes on the top of the float 20 in order to prevent the fuel from being discharged.

Therefore, when the fuel in the fuel tank is filled below the float 20, the evaporation gas evaporated from the fuel enters the inlet 14 of the housing 10 and passes through a gap between an inner wall of the housing 10 and the float 20 and thereafter, is discharged to the canister through the orifice 16 and the discharged evaporation gas is used for engine combustion as illustrated in FIG. 3A.

Further, when the fuel in the fuel tank 30 is filled above the float 20 and the buoyancy is applied to the float 20, the float 20 rises to allow a cut-off protrusion 22 of the float 20 to plug up the orifice 16, thereby preventing the fuel from being discharged to the outside through the canister.

In particular, as illustrated in FIG. 3B, even in the situation in which the vehicle is inclined at a predetermined angle or more or turns over, when the buoyancy is applied to the float 20 by the fuel in the fuel tank, the cut-off protrusion 22 of the float 20 plugs up the orifice 16, thereby preventing the fuel from being discharged to the outside through the canister.

In this case, a moment when the float 20 rises by the buoyancy to plug up the orifice 16 is called a clog point.

However, the roll over valve in the related art smoothly performs evaporation gas discharge and fuel cut-off functions, but a large upper space of the fuel tank remains as an available space in which the fuel can be filled when the fuel is cut off, and as a result, there is a problem in that an internal volume of the fuel tank is limited by the roll over valve's clog point.

By considering the problem, when the fuel tank having a large capacity is adopted, more fuel can be filled, but the size of fuel tank for the vehicle is limited in that the fuel tank for the vehicle adopts a fuel tank having a capacity in which more fuel can be filled in order to secure mounting spaces of adjacent components including an exhaust system component, a suspension, a spare tire, and the like.

Therefore, a dual type roll over valve may be mounted on the fuel tank in order to put more fuel in the fuel tank having the same size.

Referring to FIG. 4, in a dual type roll over valve, one roll over valve is mounted on each of both sides of the fuel tank and since the fuel is cut off in one of the two roll over valves while the vehicle is inclined at a predetermined angle or more, an upper space (the available space in which the fuel can be filled) of the fuel tank is smaller than the single type roll over valve when the fuel is cut off, thereby further increasing a fuel filling capacity for the fuel tank having the same volume.

However, in the dual type roll over valve, since two roll over valves are mounted on the fuel tank, the number of components increases and manufacturing cost increases.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a roll over valve for a fuel tank of a vehicle which acquires the same effect as varying a clog point which is a moment when a float plugs up an orifice which is an evaporation gas outlet by mounting a plurality of oil surface variable fuel inflow tubes on an inlet where fuel is introduced into a float of a single type roll over valve to show the same effect as a dual type roll over valve, thereby increasing a fuel filling capacity of the fuel tank.

In one aspect, provided is a roll over valve for a fuel tank of a vehicle in which a plurality of oil surface variable fuel inflow tubes are mounted on an inlet through which fuel is introduced into a float of a single type roll over valve mounted on the fuel tank.

Preferably, the inlet through which the fuel is introduced into the float may be constituted by a plurality of inlets formed at a regular interval and oil surface variable fuel inflow tubes may be mounted on each inlet.

In an exemplary embodiment of the present invention, the oil surface variable fuel inflow tubes may be constituted by a first U-shaped tube mounted on an inlet formed at one side of the inlets through which the fuel is introduced into the float and a second U-shaped tube mounted on an inlet formed at the other side.

In another exemplary embodiment of the present invention, the oil surface variable fuel inflow tubes may be constituted by a first bending type tube mounted on an inlet formed at one side of the inlets through which the fuel is introduced into the float and a second bending type tube mounted on an inlet formed at the other side.

In yet another exemplary embodiment of the present invention, the oil surface variable fuel inflow tubes may be constituted by a first tube mounted on one inlet among a plurality of inlets through which the fuel is introduced into the float, a second tube mounted on another inlet, and a third tube mounted on the other inlet and the first to third tubes may form a concentric array.

Preferably, the oil surface variable fuel inflow tubes may be inclined downward at an angle of 1 to 5°.

In particular, when the fuel tank is inclined at a predetermined angle together with the vehicle, an inlet of oil surface variable fuel inlet tubes positioned at an upper side of the plurality of oil surface variable fuel inlet tubes may become a fuel inlet for a clog point.

Through the aforementioned problem solving means, the present invention provides the following effects.

First, a plurality of oil surface variable fuel inflow tubes are mounted on an inlet through which fuel is introduced into a float of a single type roll over valve to acquire an effect to vary a clog point which is a moment when the float plugs up an orifice which is an evaporation gas outlet, thereby showing the same effect as a dual type roll over valve.

Second, when a fuel tank is inclined at a predetermined angle or more together with a vehicle, an inlet of oil surface variable fuel inflow tubes positioned at an upper side among a plurality of oil surface variable fuel inflow tubes serves as a fuel inlet for the clog point, and as a result, an upper space (an available space in which the fuel can be filled) of the fuel tank is reduced when a clog point at which the float plugs up the orifice acts, thereby increasing a fuel filling capacity of the fuel in the fuel tank having the same volume.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
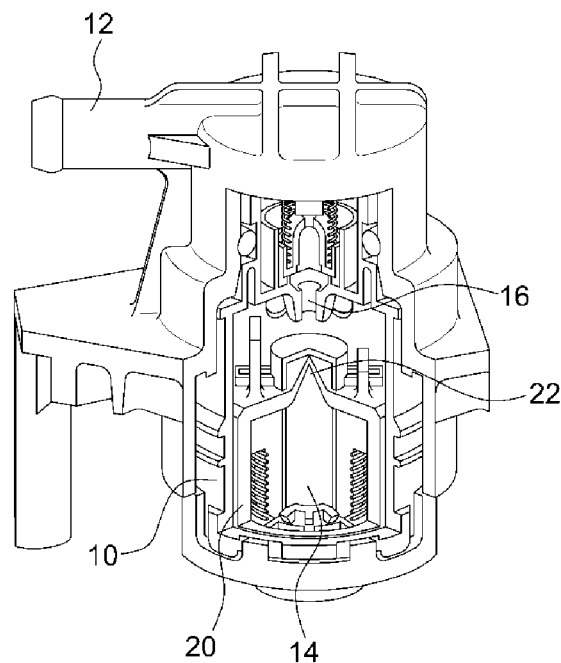
FIG. 1 is a perspective view illustrating a roll over valve for a fuel tank in the related art.
Figure 2:
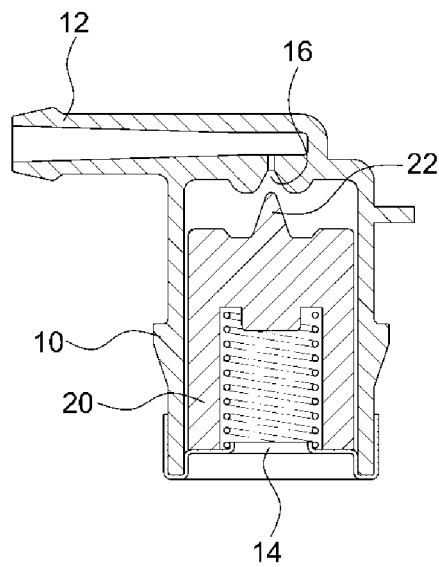
FIG. 2 is a schematic cross-sectional view illustrating the roll over valve for a fuel tank in the related art.
Figure 3A:
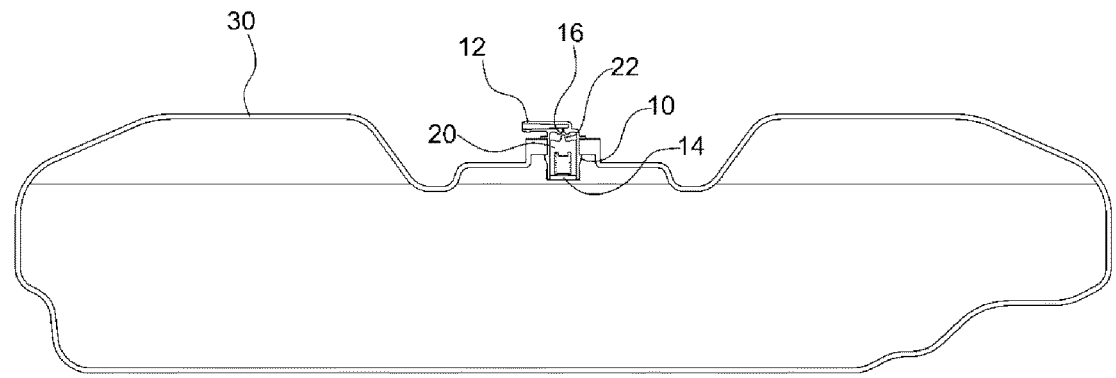
FIG. 3 is a cross-sectional view illustrating an operational state of a roll over valve for a fuel tank in the related art.
Figure 3B:
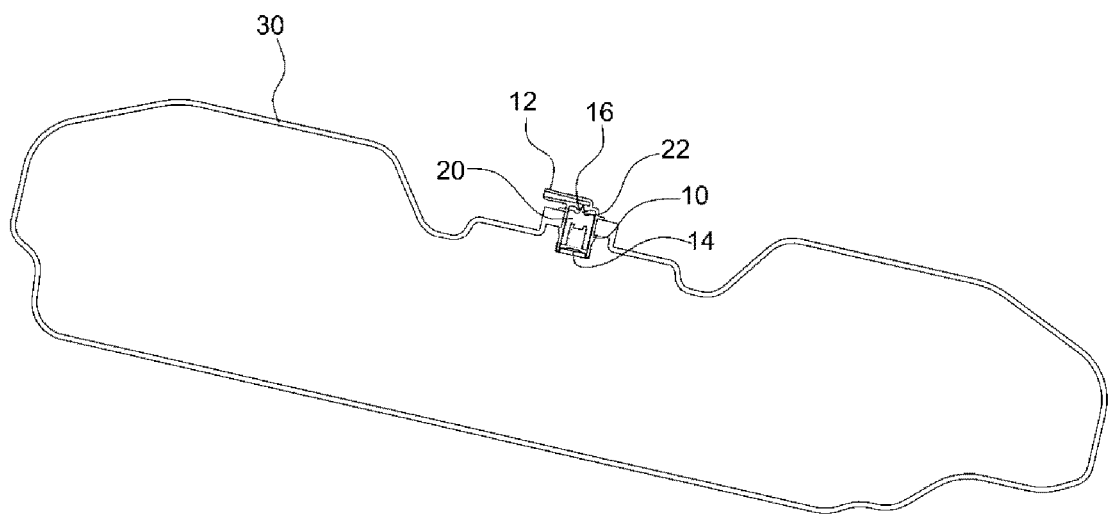
Figure 4:
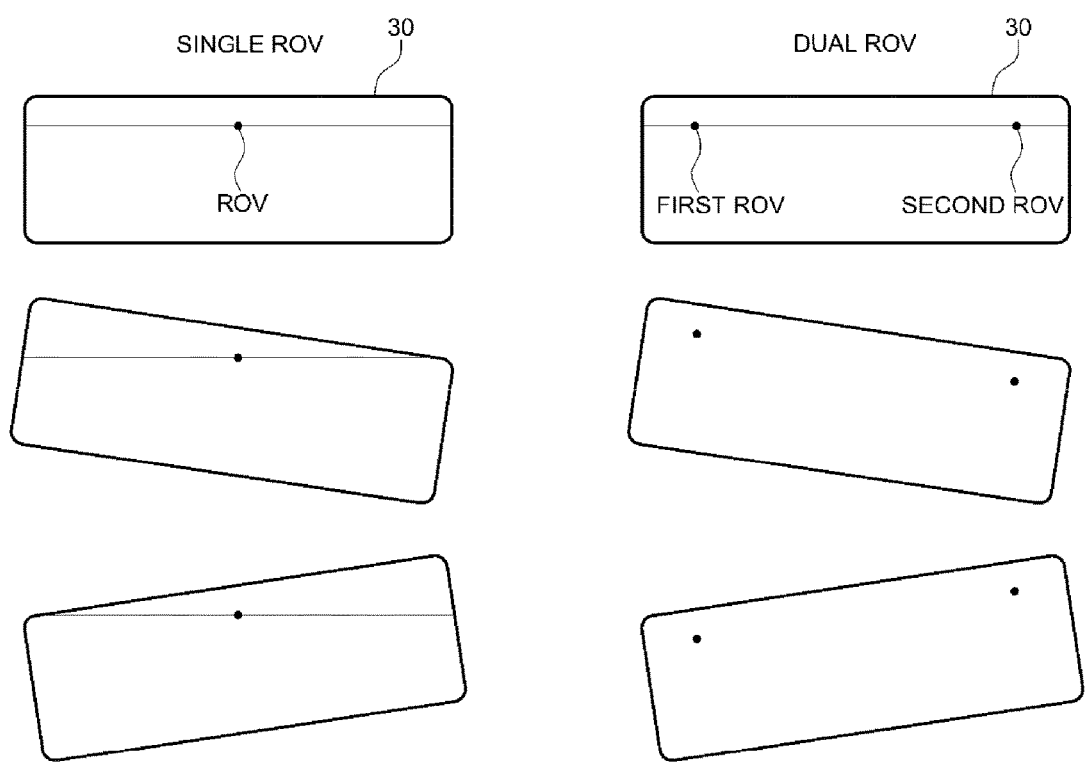
FIG. 4 is a schematic view illustrating a comparison of operational states of a single type roll over valve and a dual type roll over valve in the related art.

Reference numerals set forth in the Drawings includes reference to the following elements as further discussed below:

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

The present invention is to provide a single type roll over valve mounted on an upper center area of a fuel tank and a plurality of oil surface variable fuel inflow tubes are mounted on an evaporation gas or fuel inlet of a roll over valve to show the same effect as increasing a fuel filling capacity in the fuel tank like a dual type roll over valve.

Figure 5:
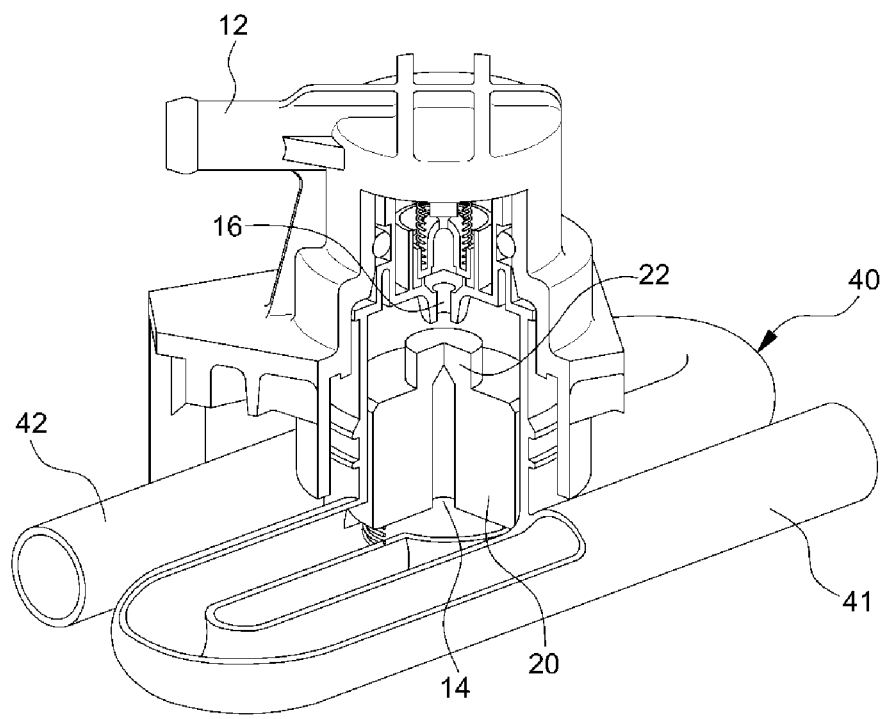
FIG. 5 is a perspective view illustrating a roll over valve for a fuel tank according to the present invention.
Figure 6:
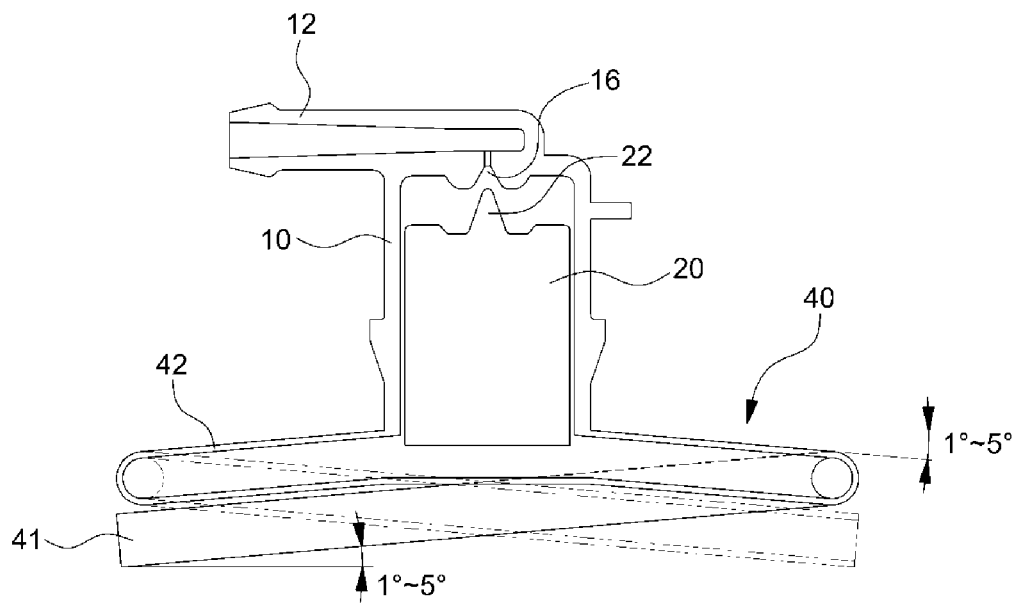
FIG. 6 is a schematic cross-sectional view illustrating the roll over valve for a fuel tank according to the present invention.

FIG. 5 is a perspective view illustrating a roll over valve for a fuel tank according to an exemplary embodiment of the present invention. FIG. 6 is a schematic cross-sectional view illustrating a roll over valve for a fuel tank according to an exemplary embodiment of the present invention.

In FIGS. 5 and 6, reference numeral 10 represents a housing of the roll over valve.

A nipple 12 for connection with a canister for discharging evaporation gas is formed on the top of the housing 10, an inlet 14 into which the evaporation gas or the fuel is introduced is formed on the bottom of the housing 10, and a float 20 which is elevatable by buoyancy is embedded in the housing 10.

Further, an orifice 16 through which the evaporation gas is discharged is formed on the top of the housing 10, that is, just at an upper side corresponding to the top of the float 20 and a cut-off protrusion 22 that plugs up the orifice 16 integrally protrudes on the top of the float 20 in order to prevent the fuel from being discharged.

Therefore, when the fuel in the fuel tank is filled below the float 20, the evaporation gas evaporated from the fuel enters the inlet 14 of the housing 10 and passes through a gap between an inner wall of the housing 10 and the float 20 and thereafter, is discharged to the canister through the orifice 16 and the discharged evaporation gas is used for engine combustion.

Herein, a plurality of oil surface variable fuel inflow tubes 40 having a predetermined length is integrally mounted or molded at the inlet 14 through which the evaporation gas or the fuel is introduced toward the bottom of the float 20 on the bottom of the housing 10.

The inlet 14 of the housing 10 through which the fuel is introduced into the float 20 is preferably constituted by a plurality of inlets formed at a regular interval in order to mount several oil surface variable fuel inflow tubes 40.

Therefore, the oil surface variable fuel inflow tubes 40 are mounted on the plurality of respective inlets 14, and as a result, each oil surface variable fuel inflow tube 40 is constituted by the plurality of parts extended and arranged.

The oil surface variable fuel inflow tubes 40 according to the exemplary embodiment of the present invention are constituted by a first U-shaped tube 41 which is mounted on the inlet 14 formed at one side and a second U-shaped tube 42 mounted on the inlet 14 formed at the other side, while the inlet 14 of the single type roll over valve, that is, the inlet 14 through which the fuel is introduced into the bottom of the float 20 is formed at both sides of the bottom of the housing 10, as illustrated in FIGS. 5 and 6.

Figure 8:
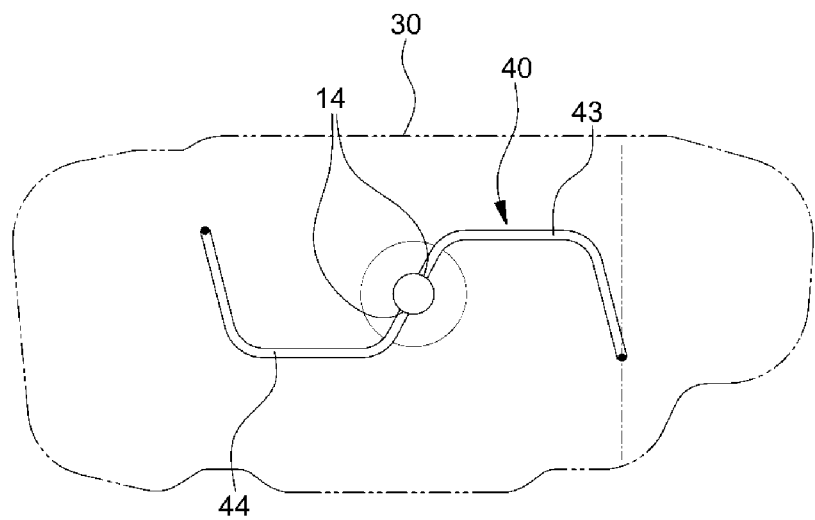
FIG. 8 and FIG. 9 are schematic views illustrating another exemplary embodiment of a roll over valve for a fuel tank according to the present invention.

The oil surface variable fuel inflow tubes 40 according to another exemplary embodiment of the present invention which adopt a bending type tube bent in various shapes including a curved shape, a " ⊏ " shape, an "S" shape, and the like are constituted by a first bending type tube 43 mounted on one inlet 14 which is a passage through which the fuel is introduced to the float and a second bending type tube 44 mounted on the other inlet 14 as illustrated in FIG. 8.

Figure 9:
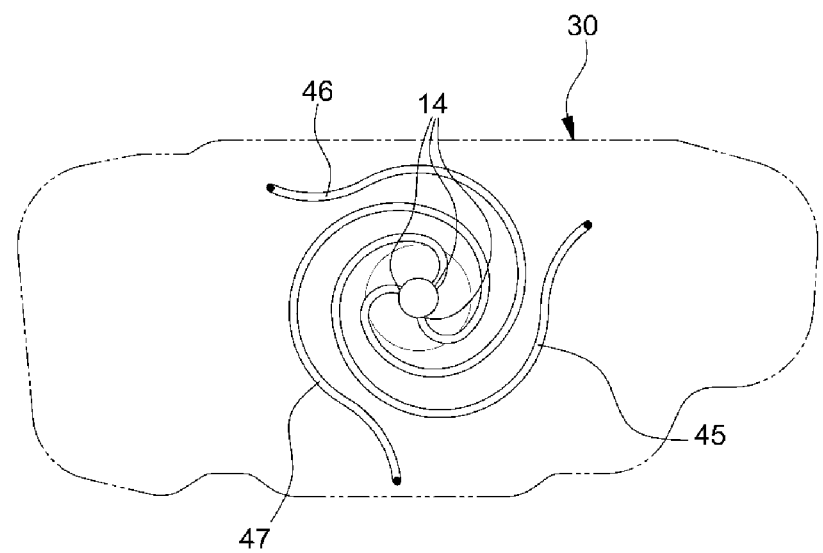

The oil surface variable fuel inflow tubes according to yet another exemplary embodiment of the present invention are constituted by a first tube 45 mounted on one inlet 14, a second tube 46 mounted on another one inlet 14 and a third tube 47 mounted on the other inlet 14, while three or more inlets 14 which are passages through which the fuel is introduced into the float are formed at a regular interval as illustrated in FIG. 9.

In this case, the first tube 45 to the third tube 47 are extended while forming a concentric array with each other and the ends of the respective tubes 45, 46, and 47 are arranged at different positions at a regular interval.

Meanwhile, the oil surface variable fuel inflow tubes 40 according to each exemplary embodiment of the present invention are preferably connected to be inclined downward at an angle of 1 to 5° as illustrated in FIG. 6 and the reason is to improve venting performance in which the fuel enters the oil surface variable fuel inflow tubes 40 and thereafter, naturally falls to the bottom of the fuel tank to be discharged again.

In other words, the reason for connecting the oil surface variable fuel inflow tubes 40 to be inclined downward at an angle of 1 to 5° is to improve the venting performance of the fuel by naturally dropping the fuel in the oil surface variable fuel inflow tubes 40 which is inclined downward to the bottom of the fuel tank when the fuel is filled in the fuel tank and filled in the oil surface variable fuel inflow tubes 40 and thereafter, a fuel amount decreases below the oil surface variable fuel inflow tubes 40 with fuel consumption, thereby preventing the fuel from continuously staying in the oil surface variable fuel inflow tubes 40.

Herein, an operational flow for a roll over valve for a fuel tank of a vehicle according to an exemplary embodiment of the present invention will be described below with reference to FIG. 7.

In order to help understand the operational flow of the present invention, one exemplary embodiment in which the cross point variable valve is constituted by the first U-shaped tube and the second U-shaped tube will be described as an example.

As described above, the oil surface variable fuel inflow tubes according to the exemplary embodiment of the present invention are constituted by the first U-shaped tube 41 mounted on the inlet 14 formed at one side of the inlet 14 through which the fuel is introduced into the bottom of the float 20 and the second U-shaped tube 42 mounted on the inlet 14 formed at the other side.

Figure 7A:
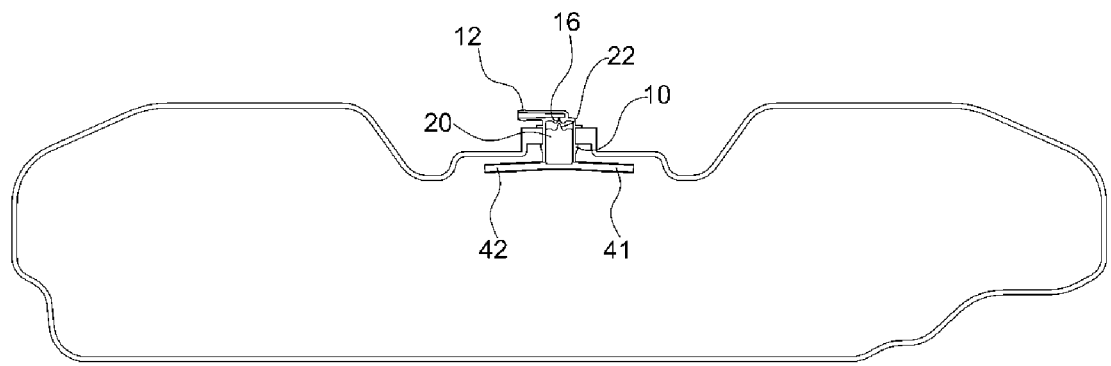
FIG. 7 is a cross-sectional view illustrating an operational state of a roll over valve for a fuel tank according to the present invention.

As illustrated in FIG. 7A, when the fuel in the fuel tank 30 is filled below the float 20, the evaporation gas evaporated from the fuel enters the inlet 14 of the housing 10 and passes through a gap between an inner wall of the housing 10 and the float 20 and thereafter, is discharged to the canister through the orifice 16 and the discharged evaporation gas is used for engine combustion.

Further, in the case where the fuel in the fuel tank 30 is filled above the float 20 while the fuel tank 30 maintains a horizontal state, when the fuel passes through the first U-shaped tube 41 and the second U-shaped tube 42 and thereafter, enters the float 20 through the inlet 14, buoyancy is applied to the float 20 and thus the float 20 rises, and as a result, the cut-off protrusion 22 of the float 20 plugs up the orifice 16, thereby preventing the fuel from being discharged to the outside through the canister.

Figure 7B:
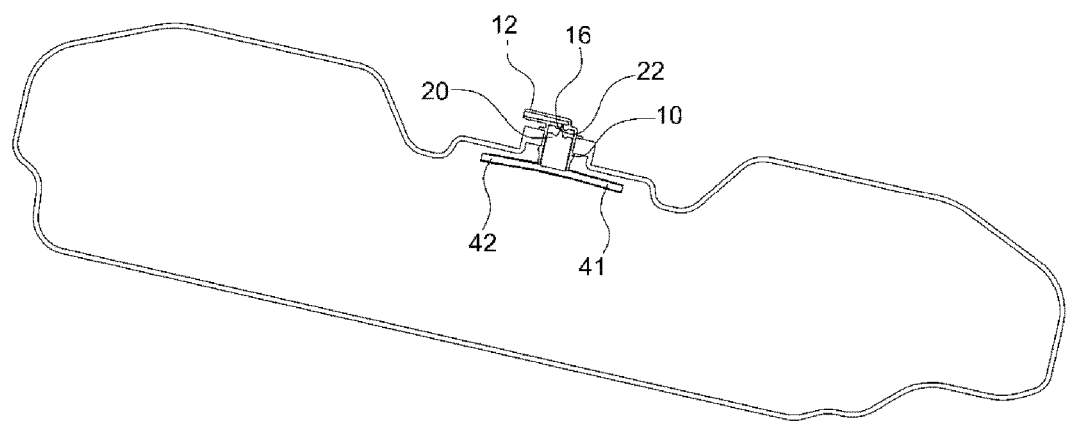

In this case, as illustrated in FIG. 7B, when the vehicle is inclined at a predetermined angle or more, the fuel tank 30 is also inclined, and as a result, the first U-shaped tube 41 faces downward and the second U-shaped tube 42 faces upward, and therefore, the second U-shaped tube 42 is immersed in the fuel and the first U-shaped tube 41 may not be immersed in the fuel.

In such a state, although the fuel passes through the first U-shaped tube 41 and thereafter, enters the float 20, the buoyancy is not applied to the float 20 and the orifice is not closed and the reason is that fuel for providing the buoyancy to the float 20 is not filled inside the second U-shaped tube 42 and above an inlet of the second U-shaped tube 42.

Figure 7C:
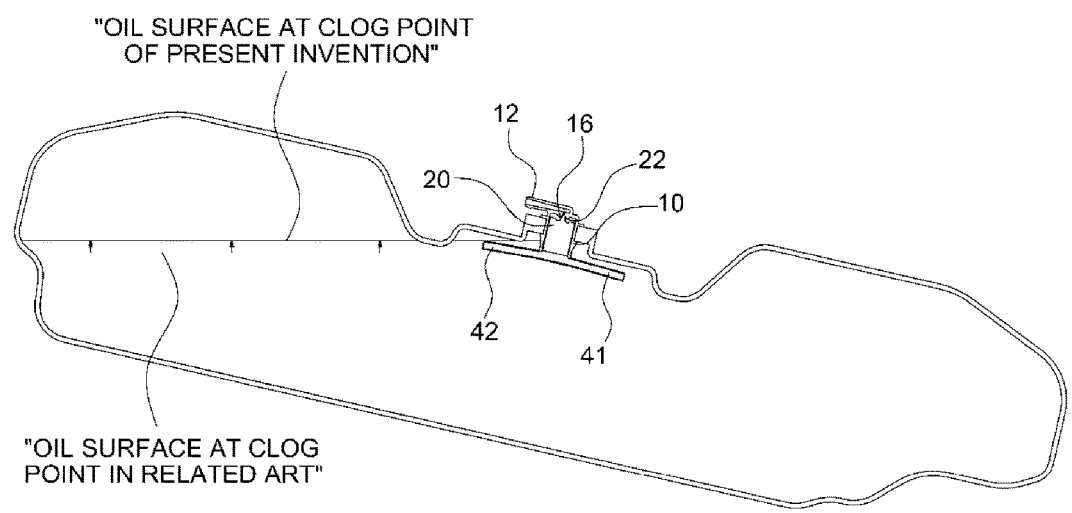

On the contrary, when the vehicle is inclined at a predetermined angle or more while more fuel is filled in the fuel tank 30, both the first U-shaped tube 41 and the second U-shaped tube 42 are immersed in the fuel as illustrated in FIG. 7C.

As such, when both the first U-shaped tube 41 and the second U-shaped tube 42 are immersed in the fuel, the fuel passes through the first U-shaped tube 41 and thereafter, enters the float 20 and the fuel passes through the inlet of the second U-shaped tube 42 and the inside of the second U-shaped tube 42 and thereafter, enters the float 20 and the buoyancy is applied to the float 20. Therefore, the clog point is reached, in which the float 20 rises and the cut-off protrusion 22 of the float 20 plugs up the orifice 16 to prevent the fuel from being discharged to the outside through the canister.

In this case, referring to FIG. 7C, since the clog point at which the orifice 16 is plugged up becomes a moment when both the first U-shaped tube 41 and the second U-shaped tube 42 are immersed in the fuel, that is, a moment when the fuel is filled above the inlet of the second U-shaped tube 42, a clog point is reached, at which the orifice is plugged up on a higher fuel oil surface than a fuel oil surface at a clog point at which the existing orifice is plugged up.

In other words, when the fuel tank 30 is inclined at a predetermined angle or more together with the vehicle, since the orifice 16 is plugged up at the time when the fuel is filled up to an inlet of an oil surface variable fuel inflow tubes 40 positioned at an uppermost location among the plurality of oil surface variable fuel inflow tubes 40, the same effect as if the clog point varies may be acquired.

As such, in the case where the fuel tank is inclined at a predetermined angle or more together with the vehicle, when the fuel is filled up to an inlet of an oil surface variable fuel inflow tubes 40 positioned at an uppermost location among the plurality of oil surface variable fuel inflow tubes 40, since the float plugs up the orifice by the buoyancy, the effect as varying the clog point of the orifice more upward may be acquired, and as a result, an upper space (an available space in which the fuel can be filled) of the fuel tank is reduced by the fuel filled in the fuel tank at the fuel cut-off time of the orifice, thereby increasing the fuel filling capacity in the fuel tank having the same volume.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roll over valve apparatus for a fuel tank of a vehicle, wherein a plurality of oil surface variable fuel inflow tubes are mounted on an inlet of a housing through which fuel is introduced into a float of a single roll over valve mounted on the fuel tank.

2. The roll over valve apparatus of claim 1, wherein the inlet through which the fuel is introduced into the float includes a plurality of inlets formed at a regular interval and the oil surface variable fuel inflow tubes are mounted on each inlet.

3. The roll over valve apparatus of claim 1, wherein the oil surface variable fuel inflow tubes include a first U-shaped tube mounted on an inlet formed at a first side of inlets through which the fuel is introduced into the float and a second U-shaped tube mounted on an inlet formed at a second side.

4. The roll over valve apparatus of claim 1, wherein the oil surface variable fuel inflow tubes include a first bending tube mounted on an inlet formed at a first side of inlets through which the fuel is introduced into the float and a second bending tube mounted on an inlet formed at a second side.

5. The roll over valve apparatus of claim 1, wherein the oil surface variable fuel inflow tubes include a first tube mounted on a first inlet among a plurality of inlets through which the fuel is introduced into the float, a second tube mounted on a second inlet, and a third tube mounted on a third inlet.

6. The roll over valve apparatus of claim 5, wherein the first to third tubes form a concentric array.

7. The roll over valve apparatus of claim 1, wherein the oil surface variable fuel inflow tubes are inclined downward at an angle of 1 to 5°.

8. The roll over valve apparatus of claim 1, wherein when the fuel tank is inclined at a predetermined angle or more together with the vehicle, an inlet of the oil surface variable fuel inflow tubes positioned at an upper side of the plurality of oil surface variable fuel inflow tubes becomes a fuel inlet for a reach of a clog point.

* * * * *